United States Patent [19]

Amjad

[11] Patent Number: 4,652,377
[45] Date of Patent: Mar. 24, 1987

[54] INHIBITION OF ALKALINE EARTH SULFATE SCALES

[75] Inventor: Zahid Amjad, Avon Lake, Ohio

[73] Assignee: The BF Goodrich Company, Akron, Ohio

[21] Appl. No.: 767,464

[22] Filed: Aug. 20, 1985

[51] Int. Cl.⁴ ............................................. C02F 5/14
[52] U.S. Cl. ............................. 210/699; 162/DIG. 4; 210/701; 252/180
[58] Field of Search .............. 162/DIG. 4; 166/244.1; 203/7; 210/698–701; 252/180, 181

[56] References Cited

U.S. PATENT DOCUMENTS

| | | | |
|---|---|---|---|
| 2,497,062 | 2/1950 | Artz | 210/698 |
| 2,626,238 | 1/1953 | Artz | 210/698 |
| 3,886,205 | 5/1975 | Geffers et al. | 210/699 |
| 4,209,398 | 6/1980 | Ii et al. | 210/701 |
| 4,357,254 | 11/1982 | Kapiloff et al. | 134/42 |
| 4,460,472 | 7/1984 | Kapiloff et al. | 210/699 |
| 4,496,470 | 1/1985 | Kapiloff et al. | 134/42 |

Primary Examiner—Peter Hruskoci
Attorney, Agent, or Firm—George A. Kap; Alan A. Csontos

[57] ABSTRACT

Inhibition of sulfate scale precipitation in a water system is accomplished by adding to said water system an effective threshold inhibition amount of a polyacrylic acid, phytic acid, and a phosphonocarboxylic acid containing at least one phosphono group, at least two carboxylic groups, and a hydrocarbon chain of at least two carbon atoms. The active materials are used in the ratio of 0.1 to 30 parts polyacrylic acid and 0.1 to 30 parts phosphonocarboxylic acid per one weight part of phytic acid.

10 Claims, No Drawings

INHIBITION OF ALKALINE EARTH SULFATE SCALES

BACKGROUND OF THE INVENTION

This invention pertains to the use of a mixture of a phosphonocarboxylic acid, phytic acid, and a polyacrylic acid to inhibit formation or precipitation of alkaline earth sulfate scale in water systems where such precipitation is a particular problem. Specific applications contemplated herein include, oil field drilling, pulp and paper, and desalination.

Scale-forming salts can be prevented from precipitating by complexing the cations with chelating or sequestering agents so that the solubility of the reaction products is not exceeded. Generally, this requires stoichiometric amounts of chelating or sequestering agent with respect to the scale-forming cation, which amounts are high and are not always desirable or economical.

More than a quarter of a century ago, it was discovered that certain inorganic polyphosphates could prevent scale precipitation when added in amounts far less than the concentrations needed for sequestering or chelating. When a precipitation inhibitor is present in a potentially scale-forming system at a markedly lower concentration than that required for sequestering the scale-forming cation, it is said to be present in a "threshold" amount. Threshold inhibition describes the phenomenon whereby a substoichiometric amount of a scale inhibitor can stabilize a solution from precipitation, which solution can contain hundreds or thousands of parts of scale-forming ions. Threshold inhibition generally takes place under conditions where a few, i.e., 1 to 10 ppm, of a polymeric inhibitor will stabilize in solution from about 100 to several thousand ppm of a scale-forming mineral.

As already discussed above, whereas threshold inhibition occurs at substoichiometric ratios of inhibitor to scale-forming cation, sequestration requires a stoichiometric ratio of sequestrant to scale-forming cation to maintain that cation in solution. Generally, sequestering takes place at a weight ratio of threshold active compound to scale-forming cation components of greater than about ten to one, depending on the anion components in the water. Threshold inhibition, however, generally takes place at a weight ratio of threshold active compound to scale forming cation components of less than about 0.5 to 1.0.

Therefore, on the basis of the above discussions, the tremendous difference between sequestration and threshold inhibition reflects the obvious advantages of the latter over the former.

U.S. Pat. No. 4,452,703 to Ralston et al describes scale inhibition of calcium phosphate and calcium hydroxide in sugar evaporation equipment by the use of a scale inhibition composition at a level of 0.1 to 200 ppm. Scale inhibitors disclosed by this patent include polymaleic acid, amine adducts of maleic anhydride polymers, phosphonobutane tricarboxylic acid, phosphinocarboxylic acids, and copolymers of an acrylic acid and a hydroxylated lower alkyl acrylate.

U.S. Pat. No. 4,386,005 to Kapiloff et al discloses the use of a mixture of polyacrylic acid and phytic acid at a level of 0.01 to 20 ppm to inhibit scaling of calcium, magnesium, and/or iron scales. The ingredients are used in the relative ratio of 1 to 0.05 part by weight of polyacrylic acid and 0.05 to 1 part by weight of phytic acid. Polyacrylic acid is of a low molecular, ranging from about 1,000 to about 10,000.

SUMMARY OF THE INVENTION

This invention is directed to a method for inhibiting precipitation of sulfate scale in an aqueous system where such a problem predominates. The method includes the step of adding to the aqueous system an effective amount of a scale inhibiting composition comprising a phosphonocarboxylic acid, a polyacrylic acid, and phytic acid in the following relative weight ratio: 0.5 to 20 parts phosphonocarboxylic acid and 0.5 to 20 polyacrylic acid per 1 weight part of phytic acid.

DETAILED DESCRIPTION OF THE INVENTION

This invention relates to a method for dispersing and maintaining dispersed particulate matter in an aqueous medium containing such matter and/or for controlling the deposition of scale-imparting precipitates on surfaces of equipment used in water systems containing such precipitates, or precipitate-forming ions, under conditions which form the precipitates. The method comprises the step of adding to preferably neutral or alkaline water an effective amount of a scale inhibition composition defined herein to inhibit deposition of the sulfate precipitates, particularly alkaline earth sulfates such as calcium sulfate, barium sulfate, and strontium sulfate.

The invention disclosed herein has general applicability to any water system where formation and deposition of sulfate scale is a potential problem, however, it is particularly directed to oil field drilling, pulp and paper, and desalination.

As is demonstrated herein, the use of an effective amount of a composition comprising a phosphonocarboxylic acid, a polyacrylic acid, and phytic acid, is suitable for inhibiting precipitation or deposition of sulfate scale. These active materials that comprise the scale inhibiting composition can be added to an aqueous system to be treated in an amount effective for the intended purpose, taking into account the respective concentrations of potential scale and deposit formers, pH of water, and the chemical and physical properties of the scale inhibiting composition. For the most part, the scale inhibiting composition will be effective when used at levels of 0.1 to 500 parts per million (ppm) of water, preferably 0.5 to 100 ppm, and more preferably 1 to 20 ppm of water to be treated. The amounts given herein represent amounts of all three active materials, i.e., a phosphonocarboxylic acid, a polyacrylic acid, and phytic acid. On the basis of 1 weight part of phytic acid, the relative proportion of each of the other materials is 0.1 to 30 parts phosphonocarboxylic acid, preferably 0.5 to 20 parts; and 0.1 to 30 parts polyacrylic acid, preferably 0.5 to 20 parts. In an especially preferred embodiment, the relative amount of the active ingredients is 1 to 10 parts of said polyacrylic acid and 1 to 10 parts of said phosphonocarboxylic acid per 1 weight part of phytic acid.

The invention disclosed herein provides surprising results since phosphonocarboxylic acid alone does not inhibit sulfate scale to any significant degree and mixtures of polyacrylic acid and phytic acid showed only a moderate activity against this type of scale when tested in absence of phosphonocarboxylic acid. However, results were unexpectedly high, in terms of sulfate scale inhibition, when phosphonocarboxylic acid was tested together with polyacrylic and phytic acids.

In the preparation of a polyacrylic acid, although acrylic acid is preferred, monounsaturated monocarboxylic acids containing 3 to 4 carbon atoms are also suitable. Specific examples of other suitable acids include methacrylic and crotonic acids, which can also be copolymerized with the acrylic acid. Especially preferred copolymers in this connection are copolymers of acrylic acid and methacrylic acid where there is a predominant proportion of acrylic acid. While it is preferred to use homopolymers of acrylic acid or the other acids, it is contemplated that the acid monomer may be copolymerized with up to as much as 35 weight percent, preferably up to 10 weight percent, of other water-soluble vinyl monomers such as acrylamide, methacrylamide, styrene sulphonic acid, and the like. Also, up to 35%, and preferably up to 10% of acrylate esters, such as methyl acrylate or ethyl methacrylate, may be copolymerized with the acid monomers.

Since polymeric species of acrylic acid are limited in their water-solubility, it is preferred that the polymers be used in the form of their water-soluble salts such as the sodium, potassium, ammonium or amine salts. Generally, the polymers can be neutralized with a strong alkali, such as sodium hydroxide, in which instance, the hydrogen atom of the carboxyl group of the acid units will be replaced with a sodium atom. With the use of an amine neutralizing agent, the hydrogen will be replaced with an ammonium group. Useful polymers include polymers that are unneutralized, partially neutralized, and completely neutralized.

The acid monomers can be polymerized, if desired, in a conventional manner but they are commercially available and therefore, can be purchased. Polymerization of the acid monomers results in an essentially non-cross-linked random polymer, the molecular weight of which can be adjusted with a little trial and error. The polymer is preferably formed in a high yield ranging from about 50 to 99% by weight of the monomers.

It is also desirable that the polymer be soluble in water. Although, typically, the scale inhibition composition will be added to water at a level of about 0.1 to 200 ppm on dry basis, the polyacrylic acid or its salt is generally shipped in drums as a concentrated aqueous solution containing about 20 to 50% by weight of solids per 100 parts of solution. It is this latter consideration that makes it desirable to have a highly water-soluble polyacrylic acid or its salt to facilitate shipment thereof.

Polymerization of the acid monomers and comonomers identified herein can be carried out in a mutual solvent for both, such as in a hydrocarbon solvent, whether aliphatic or aromatic, a lower alkanol of about 1 to 6 carbon atoms, or in water, with an effective amount of a free radical initiator sufficient to produce the desired composition within an acceptable period of time. The monomeric acid can be used as such or it can be in a partially or a completely neutralized form prior to polymerization.

The reaction is conveniently carried out in water as the only reaction medium at a temperature in the range of about 30° C. to about 130° C. usually at atmospheric, or slightly elevated pressure. The concentration of the polymer formed may range from about 20% to about 50% by weight, based on total solids, which solution can be shipped directly.

The polymer can also be formed in an acyclic ketone, such as acetone, or in an acyclic ester, such as ethyl acetate, in an alkanol, or in xylene or toluene. If, for example, the polymer is formed in an organic solvent, or a mixture of an organic solvent and water, the polymer is converted from the organic solvent solution to a water solution. Typically, the organic solvent is stripped from the solution with steam, or distilled off with subsequent additions of water and repetition of distillation to remove the solvent, followed by the addition of water and a neutralizing agent such as caustic solution, ammonia, a hydrazine, or a low-boiling primary, secondary or tertiary aliphatic amine.

The final aqueous solution of polymer salt is preferably in the range of about pH 2 to about pH 8, with a total solids content of about 2 to about 60% by weight, and preferably about 20 to about 50% by weight of polymer in water.

The polyacrylic acids suitable herein have weight average molecular weight in the range of about 500 to about 100,000, and preferably about 1,000 to about 20,000, as determined by gel permeation chromatography. This determination is conventionally made according to ASTM method D-3536-76 by dissolving the esterified polymer in tetrahydrofuran and comparing it with a solution in THF of polystyrene of known molecular weight. The acid numbers of the polymers formed, as determined by a conventional titration with KOH, may range from about 310 to about 740, corresponding to a weight fraction of from 40% to about 95% by weight of monomer units having COOH groups. The preferred acrylic acid polymers have more than 50% by weight of free carboxyl groups and an acid number in the range from about 390 to about 700.

In a typical polymerization process, a glass lined or stainless steel jacketed reactor is charged with a predetermined amount of monomer along with the polymerization catalyst under a nitrogen blanket, and the reaction mixture allowed to exotherm under controlled temperature conditions maintained by a heat-transfer fluid in the jacket of the reactor. The pressure under which the reaction occurs is not critical, it being convenient to carry it out under atmospheric pressure. A shortstop agent can be used to terminate the reaction at a predetermined conversion rate. Generally speaking, the polyacrylic acids and their salts can be prepared in a manner that is well known in the art.

Phytic acid has the formula of $C_6H_6O_6(H_2PO_3)_6$ and is also known as inositolhexaphosphoric acid. It is a powder that is slightly soluble in water. Phytic acid is available commercially in food grade as well as other grades, which can also be used satisfactorily herein.

Mixtures of polyacrylic acid and phytic acid are available commercially from Chemical Sciences, Inc. One such product is denoted as AF-100, is a 43% aqueous solution of a low molecular weight polyacrylic acid and phytic acid, in the relative weight ratio of the two acids of 85/15. Another product is AF-200, a 44% aqueous solution of a low molecular weight polyacrylic acid and phytic in the relative weight ratio of 50/50, polyacrylic acid to phytic acid. The polyacrylic acid in these products has weight average molecular weight of about 2,100.

The third essential component of the scale inhibition composition described herein is at least one phosphonocarboxylic acid defined by the following formulas I and II:

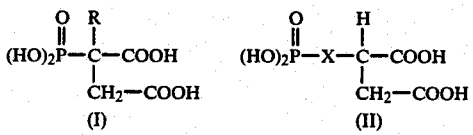

where R is hydrogen, alkyl, alkenyl, or alkinyl radical having 1 to 4 carbon atoms, an aryl, cycloalkyl, or aralkyl radical, or the radical selected from the following:

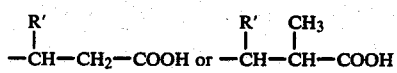

where R' is hydrogen, alkyl radical of 1 to 4 carbon atoms, or a carboxyl radical; and X is selected from the following:

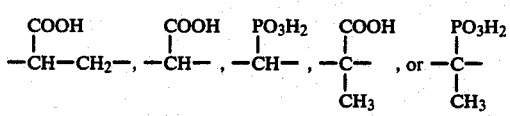

where the —PO$_3$H$_2$group is the phosphono group

Illustrative of specific phosphonocarboxylic acids include α-methlphosphonosuccinic acid, phosphonosuccinic acid, 1-phosphonopropane-2,3-dicarboxylic acid, 2-phosphonobutane-1,2,4-tricarboxylic acid, α-allyl-phosphonosuccinic acid, α-p-chlorophenylphosphonosuccinic acid, α-propargyl-phosphonosuccinic acid, α-benzyl-phosphonosuccinic acid, α-cyclohexyl-phosphonosuccinic acid, 2-phosphono-3-(α-methyl-carboxymethyl)-hexane-1,2,4 tricarboxylic acid, 2,2-diphosphone-butane-2,4-dicarboxylic acid, and the like. The preferred phosphonocarboxylic acid is 2-phosphonobutane-1,2,4-tricarboxylic acid.

The phosphonocarboxylic acids are also referred to herein as phosphonoalkane carboxylic acids that contain at least one and preferably one or two phosphono groups

at least two and preferably two or three carboxylic acid groups, with the main hydrocarbon chain containing at least 2 and preferably 2 to 6 carbon atoms with substituents on the chain selected from alkyl, alkenyl, alkinyl, aryl, arylalkyl, alkaryl, and carboxylated and halogenated versions thereof. These acids and preparation thereof are described in U.S. Pat. Nos. 3,886,204, 3,886,205 and 4,026,815, all of which are incorporated by reference as if fully set forth herein.

The scale inhibiting composition described herein is used to treat water which contains calcium ions and sulfate ions. The threshold tests for calcium sulfate inhibition were carried out as follows: supersaturated solutions of 6,220 ppm CaSO$_4$ at a pH 7.0, or as otherwise indicated, and containing 0-3 ppm of inhibitor were prepared. Solutions were then stored in capped four-ounce jars and placed in a 66° C. oven without agitation. After 24 hours, solutions were filtered through 0.22 micrometer filter paper and calcium analyzed by EDTA titrations. Synergistic results are also obtainable at acid pH as well, which is unexpected to one skilled in the art. Scale inhibition tests for barium sulfate were carried out in the same manner as for calcium sulfate with different conditions.

The percent threshold inhibition (TI) attained for each experiment is obtained using the following formula:

$$\% \, TI = \frac{(Ca)\text{exp} - (Ca)\text{final}}{(Ca)\text{initial} - (Ca)\text{final}} \times 100$$

where
- (Ca) exp = concentration of calcium ions in the filtrate in presence of the polymer at time 24 hours
- (Ca) final = concentration of calcium ions in filtrate in absence of the polymer at time 24 hours
- (Ca) initial = concentration of calcium ions at time zero.

EXAMPLE 1

This example demonstrates the unexpected effectiveness of scale inhibition against calcium sulfate scaling which was carried out in the manner described above. Results of the tests on calcium sulfate scale are given in Table I, below, where PAA represents polyacrylic acid and PCA is 2-phosphonobutane-1,2,4-tricarboxylic acid:

TABLE I

| Sample No. | PAA ppm | Phytic A ppm | PCA ppm | % TI |
|---|---|---|---|---|
| 1 | 0.85 | 0.15 | 0 | 20 |
| 2 | 0.42 | 0.18 | 0.5 | 67 |
| 3 | 0.21 | 0.04 | 0.75 | 87 |
| 4 | 0.64 | 0.11 | 0.25 | 38 |
| 5 | 0 | 0 | 1.0 | 14 |
| 6 | 1.28 | 0.22 | 0 | 16 |
| 7 | 0.64 | 0.11 | 0.75 | 93 |
| 8 | 0.42 | 0.18 | 1.0 | 96 |
| 9 | 0.85 | 0.15 | 0.50 | 58 |
| 10 | 0 | 0 | 1.50 | 22 |
| 11 | 1.0 | 0 | 0 | 44 |
| 12 | 1.5 | 0 | 0 | 68 |
| 13 | 2.5 | 0 | 0 | 94 |
| 14 | 0 | 1.0 | 0 | 20 |

Results in Table I demonstrate ineffectiveness of the phosphonocarboxylic acid when used alone or when the compositions were devoid of it. This is evident from samples #1, #5, #6 and #10. For effective inhibition, the combined amounts of said polyacrylic acid and phytic acid should equal to or be less than the amount of the phosphonocarboxylic acid. The relative amounts of polyacrylic acid to phytic acid, however, should be in the range of 1/1 to 10/1, preferably 2/1 to 5/1. The above results demonstrate unexpected effectiveness of the compositions against calcium sulfate scale.

EXAMPLE 2

This example demonstrates effectiveness of scale inhibiting compositions against barium sulfate scaling. Supersaturated barium sulfate samples (118 ppm) were prepared at pH of 7.5 containing the indicated amounts of scale inhibiting composition. The samples were stored in capped 4-ounce jars and placed in water bath maintained at 25° C. for 24 hours and then filtered through 0.22 micron filter paper. Analysis for barium sulfate was conducted using atomic absorption spectroscopy. Pursuant to this example, phosphonocarboxylic (PCA) acid alone was used in an attempt to inhibit precipitation of barium sulfate in the manner described above. Mixtures of polyacrylic acid and phytic acid were also similarly tried. Finally, the phosphonocarboxylic acid was used in conjunction with mixtures of polyacrylic acid and phytic acid as a scale inhibiting composition against barium sulfate scaling. Percent threshold inhibition calculated as described above, is presented for the various tests in Table II, below:

TABLE II

| Sample No. | PAA ppm | Phytic A ppm | PCA ppm | % TI |
|---|---|---|---|---|
| 1 | 1.275 | 0.225 | 0 | 52 |
| 2 | 0.638 | 0.112 | 0.75 | 87 |
| 3 | 0.75 | 0.75 | 0 | 38 |
| 4 | 0.375 | 0.375 | 0.75 | 75 |
| 5 | 0 | 0 | 1.5 | 2 |
| 6 | 0.5 | 0 | 0 | 20 |
| 7 | 1.0 | 0 | 0 | 46 |
| 8 | 1.25 | 0 | 0 | 77 |
| 9 | 1.5 | 0 | 0 | 95 |
| 10 | 0 | 0.5 | 0 | 5 |
| 11 | 0 | 1.0 | 0 | 4 |
| 12 | 0 | 2.0 | 0 | 6 |

In samples #1 and #2, AF-100 product was used to supply polyacrylic acid and phytic acid. Product AF-100 was an aqueous solution of a low molecular weight polyacrylic acid and phytic acid in relative weight ratio of 85/15. In samples #3, #4 and #5, Product AF-200 was used to supply polyacrylic acid and phytic acid. Product AF-200 was an aqueous solution containing low molecular weight polyacrylic acid and phytic acid in weight ratio of 50/50. The phosphonocarboxylic acid (PCA) used in the samples was 2-phosphonobutane-1,2,4-tricarboxylic acid.

Sample #1 in Table II demonstrates the effectiveness of polyacrylic acid together with phytic acid against barium sulfate scaling. Effectiveness of 1.275 ppm of polyacrylic acid together with 0.225 ppm of phytic acid against barium sulfate yielded threshold inhibition of only 52%. Threshold inhibition increased dramatically to 87% when 0.75 ppm of the phosphonocarboxylic acid was used together with 0.638 ppm of polyacrylic acid and 0.112 ppm of phytic acid, against barium sulfate scaling. Using a mixture of 0.75 ppm of polyacrylic acid and 0.75 ppm of phytic acid, but in absence of phosphonocarboxylic acid, threshold inhibition was a mere 38% which increased dramatically to 75% when 0.75 ppm of the phosphonocarboxylic acid was used together with 0.375 ppm of polyacrylic acid and 0.375 ppm of phytic acid. With 1.5 ppm of the phosphonocarboxylic acid alone, threshold inhibition against barium sulfate was an insignificant 2%.

Evaluation of the results presented in Table II shows the relative ineffectiveness of mixtures of polyacrylic acid with phytic acid in absence of phosphonocarboxylic acid against barium sulfate scale. Since 60% threshold inhibition is the minimum acceptable effectiveness level and 80% is the desired level, it should be apparent that 52% threshold inhibition is below the minimum acceptable level, and 38% is even more so. The data also shows the total ineffectiveness of the phosphonocarboxylic acid alone against barium sulfate scaling. The unexpected results are self-evident in Table II for scale inhibiting compositions containing the three necessary components, i.e., polyacrylic acid, phytic acid, and the posphonphonocarboxylic acic. It should be apparent from Table II that the compositions of this invention easily surpass the minimum acceptable threshold inhibition level of 60%. Sample #2, in fact, easily surpasses the desired level of 80% threshold inhibition.

I claim:

1. Method for inhibiting precipitation of sulfate scale selected from barium sulfate, calcium sulfate, strontium sulfate, and mixtures thereof in an aqueous system comprising the step of adding to the aqueous system at least an effective threshold inhibition amount of a polymeric acid or its salt, phytic acid, and phosphonocarboxylic acid; wherein said polymeric acid or its salt is a water soluble polymer of acrylic acid, methacrylic acid, or mixtures of such monomers, having a molecular weight of about 1000 to about 20,000; wherein said phosphonocarboxylic acid is 2-phosphononbutane-1,2,4 tricarboxylic acid; and wherein the relative amount of each per 1 weight part of said phytic acid is as follows: 0.1 to 30 parts of said polymeric acid and 0.1 to 30 parts of said phosphonocarboxylic acid to inhibit precipitation of said sulfate scale.

2. Method of claim 1 wherein said aqueous system is selected from oil field drilling aqueous system, pulp and paper aqueous system, and desalination aqueous system.

3. Method of claim 1 wherein total amount of said polymeric acid, said phytic acid, and said phosphonocarboxylic acid is in the range of about 0.1 to 500 ppm.

4. Method of claim 1 wherein the relative amount of each per 1 weight part of said phytic acid is as follows: 0.5 to 20 parts of said polyacrylic acid and 0.5 to 20 parts of said phosphonocarboxylic acid.

5. Method of claim 4 wherein up to 35 weight percent of said polyacrylic acid monomer is replaced with one or more other water-soluble vinyl monomers and acrylate esters.

6. Method of claim 1 wherein the relative amount of each per 1 weight part of said phytic acid is 1 to 10 parts of said polyacrylic acid and 1 to 10 parts of said phosphonocarboxylic acid.

7. Method of claim 6 wherein up to about 10% of said polyacrylic acid monomer is replaced with one or more other water-soluble vinyl monomers and acrylate esters.

8. Method of claim 1 wherein said polymeric acid is polyacrylic acid, and said sulfate scale is selected from the calcium sulfate, barium sulfate, and mixtures of such scales.

9. Method of claim 8 wherein said aqueous system is alkaline.

10. Method of claim 1 wherein said aqueous system is alkaline.

* * * * *